US011142189B2

(12) United States Patent
Matsunaga et al.

(10) Patent No.: US 11,142,189 B2
(45) Date of Patent: Oct. 12, 2021

(54) VEHICLE CONTROL DEVICE

(71) Applicant: HONDA MOTOR CO., LTD., Tokyo (JP)

(72) Inventors: Hideki Matsunaga, Wako (JP); Takeru Goto, Wako (JP); Hirokiyo Kasahara, Wako (JP); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 16/156,182

(22) Filed: Oct. 10, 2018

(65) Prior Publication Data

US 2019/0111919 A1  Apr. 18, 2019

(30) Foreign Application Priority Data

Oct. 12, 2017 (JP) .............................. JP2017-198133

(51) Int. Cl.
*B60W 30/09* (2012.01)
*B60W 50/14* (2020.01)
*G06K 9/00* (2006.01)

(52) U.S. Cl.
CPC ............ *B60W 30/09* (2013.01); *B60W 50/14* (2013.01); *G06K 9/00791* (2013.01); *B60W 2552/00* (2020.02); *B60W 2554/00* (2020.02)

(58) Field of Classification Search
CPC ............. B60W 30/09; B60W 2554/00; B60W 2552/00; B60W 50/14; G06K 9/00791
See application file for complete search history.

(56) References Cited

U.S. PATENT DOCUMENTS

| 2012/0188098 A1* | 7/2012 | Mochizuki | G08G 1/096783 340/905 |
| 2017/0158175 A1* | 6/2017 | Fairfield | B60T 7/12 |
| 2019/0073903 A1* | 3/2019 | Baba | G01S 13/931 |

FOREIGN PATENT DOCUMENTS

| JP | 2009-180705 A | 8/2009 |
| JP | 2011-113503 A | 6/2011 |
| JP | 2012-226618 A | 11/2012 |

OTHER PUBLICATIONS

Office Action dated May 14, 2019 issued over the corresponding Japanese Patent Application No. 2017-198133 with the English translation thereof.

* cited by examiner

*Primary Examiner* — Mathew Franklin Gordon
(74) *Attorney, Agent, or Firm* — Carrier Blackman & Associates, P.C.; Joseph P. Carrier; Jeffrey T. Gedeon (57) ABSTRACT

A forward movement limit determination unit determines to execute a forward movement limit in the case it is recognized that there is an intersecting road or an entering vehicle, and further, it is recognized that an event that limits traveling of a host vehicle is occurring on a more forward side of the travel direction of the host vehicle than an intersecting position or an entry position. In the case it is determined that the forward movement limit is to be executed, a vehicle control unit performs the forward movement limit, on a more opposite direction side of the travel direction than the intersecting position or the entry position.

7 Claims, 10 Drawing Sheets

VEHICLE CONTROL DEVICE

CROSS-REFERENCE TO RELATED APPLICATION

This application is based upon and claims the benefit of priority from Japanese Patent Application No. 2017-198133 filed on Oct. 12, 2017, the contents of which are incorporated herein by reference.

BACKGROUND OF THE INVENTION

Field of the Invention

The present invention relates to a vehicle control device that carries out a control to impart an opportunity of passage with respect to an entering vehicle that intends to enter into a travel path of a vehicle.

Description of the Related Art

In Japanese Laid-Open Patent Publication No. 2012-226618, a driving assist device is disclosed in which, in the case of recognizing an entering vehicle that intends to enter into a travel path of a host vehicle (user's own vehicle) just beyond a railroad crossing, the existence of the entering vehicle is notified in advance to the occupant of the host vehicle. In accordance with the driving assist device, the occurrence of a situation is prevented in which, while the host vehicle is traveling through the railroad crossing, the entering vehicle enters into the travel path just beyond the railroad crossing, and the host vehicle cannot depart from the railroad crossing.

SUMMARY OF THE INVENTION

The flow of traffic becomes smooth by each of respective vehicles imparting opportunities of passage (giving way) as appropriate. In accordance with the driving assist device disclosed in Japanese Laid-Open Patent Publication No. 2012-226618, there is a case in which, by being notified, the host vehicle stops before the railroad crossing, and as a result, the host vehicle imparts an opportunity of passage with respect to the entering vehicle. However, that which is performed by the driving assist device of Japanese Laid-Open Patent Publication No. 2012-226618 is a control for preventing the host vehicle from stopping inside of a railroad crossing, and it is not a control by which the host vehicle positively imparts an opportunity of passage with respect to an entering vehicle.

The present invention has been devised taking into consideration the aforementioned problems, and has the object of providing a vehicle control device in which, by imparting an opportunity of passage with respect to an entering vehicle attempting to enter into a travel path of a host vehicle, within a range that does not affect forward movement of the host vehicle, it is possible for the flow of traffic to be made smooth.

The vehicle control device according to the present invention comprises:

an external environment recognition unit adapted to recognize a state of the external environment in the vicinity of a host vehicle;

a forward movement limit determination unit adapted to determine whether or not to limit forward movement of the host vehicle, on the basis of a recognition result of the external environment recognition unit; and a vehicle control unit adapted to perform the forward movement limit on the basis of a determination result of the forward movement limit determination unit;

wherein the forward movement limit determination unit determines to execute the forward movement limit, in the case it is recognized by the external environment recognition unit that there is an intersecting road intersecting with a travel path of the host vehicle in front of the host vehicle or an entering vehicle attempting to enter in front of the host vehicle, and further, an event is occurring that limits traveling of the host vehicle on a more forward side of the travel direction of the host vehicle than an intersecting position between the travel path and the intersecting rode or an entry position of the entering vehicle; and in the case it is determined by the forward movement limit determination unit that the forward movement limit is to be executed, the vehicle control unit performs the forward movement limit, on a more opposite direction side of the travel direction than the intersecting position or the entry position.

In accordance with the above configuration, by limiting forward movement of the host vehicle on a more opposite direction side of the travel direction than the intersecting position between the travel path and the intersecting road or the entry position of the entering vehicle, an opportunity of passage can be imparted with respect to the entering vehicle attempting to enter into the travel path, and thus it becomes possible to smooth the flow of traffic. Further, since the forward movement limit is performed in the case that an event is occurring which limits traveling of the host vehicle on the forward side of the travel direction, or stated otherwise, in the case that the host vehicle is incapable of proceeding forward, substantially no disadvantage occurs in which forward movement of the host vehicle is delayed due to the forward movement limit. In other words, there is no influence on the forward movement of the host vehicle. Further, by carrying out the forward movement limit, unnecessary acceleration of the host vehicle is suppressed, and therefore, energy consumption is reduced.

In the vehicle control device according to the present invention, as the forward movement limit, the vehicle control unit may perform a travel control to automatically decelerate or stop the host vehicle, or a notification control to prompt a vehicle occupant to decelerate or stop the host vehicle.

In accordance with the above configuration, it is possible to provide room for the entering vehicle.

In the vehicle control device according to the present invention, the forward movement limit determination unit may determine to execute the forward movement limit, in the case it is recognized by the external environment recognition unit that the intersecting road or the entering vehicle is on the forward side of the travel direction, and further, a railroad crossing of a passage incapable state, or an intersection or a traffic jam of a passage incapable state is recognized on a more forward side of the travel direction than the intersecting position or the entry position.

The host vehicle cannot proceed forward in the event there is a railroad crossing of a passage incapable state, or an intersection of a passage incapable state, or in the case that a traffic jam is occurring on a forward side of the travel direction. In accordance with the above configuration, the forward movement limit of the host vehicle for imparting an opportunity of passage to the entering vehicle is carried out in the case that there is a railroad crossing of a passage incapable state, or in the case there is an intersection of a passage incapable state, or a traffic jam is occurring on a forward direction side in the travel direction, and therefore, no disadvantage occurs in which forward movement of the host vehicle is delayed due to the forward movement limit. In other words, there is no influence on the forward movement of the host vehicle. Further, by carrying out the forward movement limit, unnecessary acceleration of the host vehicle is suppressed, and therefore, energy consumption is reduced.

In the vehicle control device according to the present invention, there may further be provided a time determination unit adapted to determine a first time period from a current point in time until the railroad crossing or the intersection transitions to the passage incapable state, and a second time period required for the host vehicle to pass through the railroad crossing or the intersection, wherein the forward movement limit determination unit may determine to execute the forward movement limit, in the case it is recognized by the external environment recognition unit that the intersecting road or the entering vehicle is on the forward side of the travel direction, further, the railroad crossing or the intersection of a passage capable state is recognized on a more forward side in the travel direction than the intersecting position or the entry position, and further, in the case that the first time period is shorter than the second time period.

In the case that the first time period is less than the second time period, the host vehicle is incapable of passing through the railroad crossing or the intersection before the railroad crossing or the intersection transitions from the passage capable state to the passage incapable state. For this reason, the host vehicle does not proceed forward, and is stopped before crossing the railroad crossing or the intersection. In accordance with the above configuration, since the forward movement limit of the host vehicle for imparting an opportunity of passage to the entering vehicle is performed in the case that the first time period is less than the second time period, no disadvantage occurs in which forward movement of the host vehicle is delayed due to the forward movement limit. In other words, there is no influence on the forward movement of the host vehicle. Further, by carrying out the forward movement limit, unnecessary acceleration of the host vehicle is suppressed, and therefore, energy consumption is reduced.

In the vehicle control device according to the present invention, the forward movement limit determination unit may determine that the forward movement limit should be canceled, in the case that the entering vehicle, which has entered into the travel path from the intersecting road, is recognized by the external environment recognition unit while the forward movement limit is being carried out by the vehicle control unit, and the vehicle control unit may cancel the forward movement limit, in the case it is determined by the forward movement limit determination unit to cancel the forward movement limit.

In accordance with the above configuration, it is possible to smooth the flow of traffic by imparting an opportunity of passage with respect to the entering vehicle which intends to enter into the travel path of the host vehicle, within a range that does not affect forward movement of the host vehicle.

According to the present invention, it is possible to impart an opportunity of passage with respect to an entering vehicle which intends to enter into a travel path, within a range that does not affect the forward movement of the host vehicle, and therefore, it is possible to smooth the flow of traffic.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device according to the present invention will be described in detail below with reference to the accompanying drawings. In the following description, a vehicle (user's own vehicle) which is the subject of the description will be referred to as a host vehicle, whereas vehicles other than the host vehicle will be referred to as other vehicles. Furthermore, another vehicle that intends to enter in front of the host vehicle will be referred to as an entering vehicle, and other vehicles traveling in front of the host vehicle will be referred to as preceding vehicles. Further, a roadway (which does not include an oncoming lane) including a lane in which the host vehicle travels will be referred to as a travel path. Further, a road that crosses over the travel path will be referred to as an intersecting road.

[1. Configuration of Host Vehicle 10]

Figure 1:
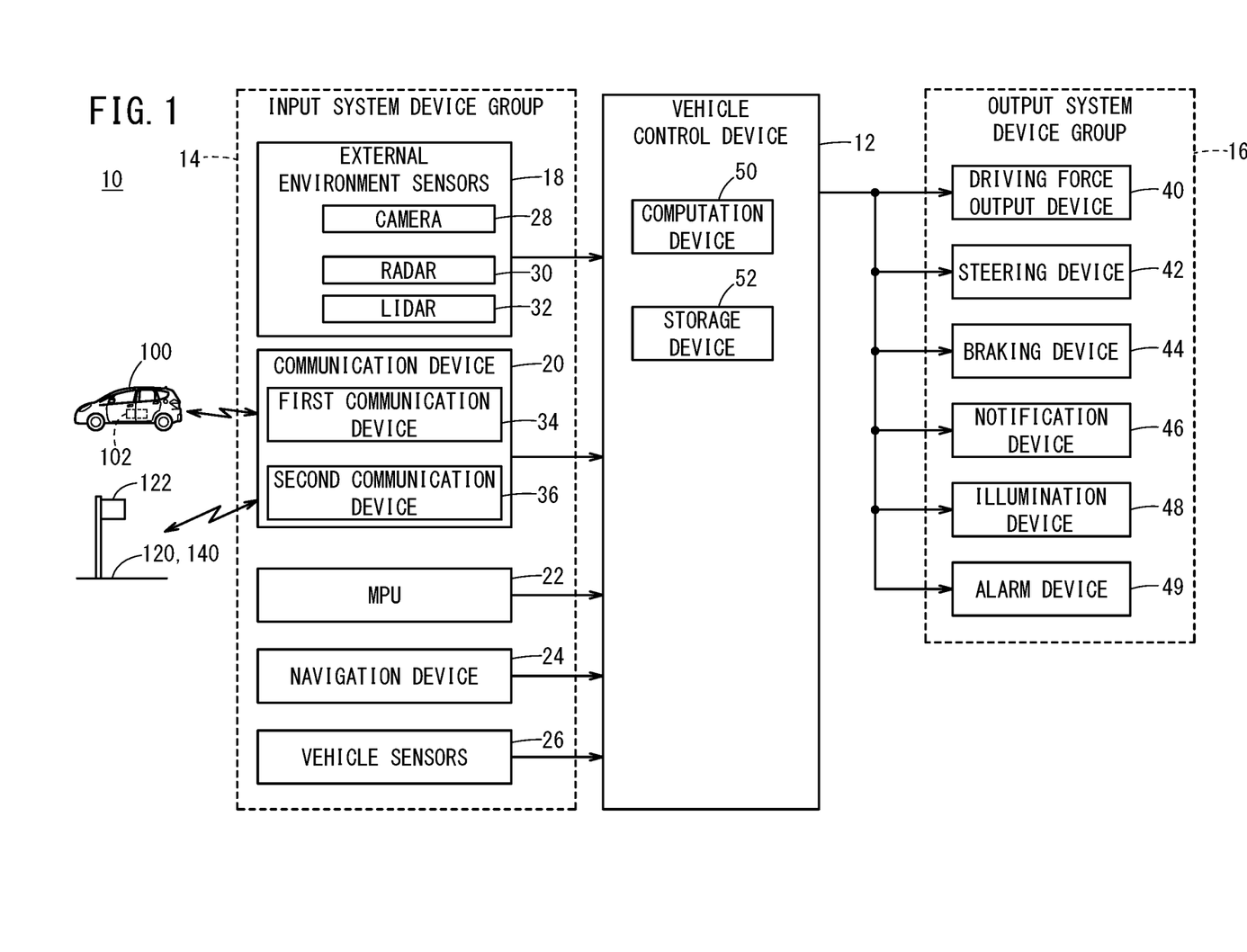
FIG. 1 is a block diagram of a host vehicle equipped with a vehicle control device according to the present embodiment.

As shown in FIG. 1, the host vehicle 10 includes a vehicle control device 12, an input system device group 14 which acquires or stores various information input by the vehicle control device 12, and an output system device group 16 which is operated in response to various instructions output by the vehicle control device 12. The host vehicle 10 is an automatically driven vehicle (including a fully automatically driven vehicle) in which driving operations are performed by the vehicle control device 12, or a driving assisted vehicle in which portions of the driving operations are assisted.

[1.1. Input System Device Group 14]

In the input system device group 14, there are included external environment sensors 18 that detect a state of the surrounding vicinity (external environment) around the host vehicle 10, a communication device 20 which carries out transmission and reception of information to and from various communication devices located externally of the host vehicle 10, an MPU (high precision map) 22 the positional precision of which is less than or equal to centimeter units, a navigation device 24 that generates a travel route to a destination together with measuring the position of the host vehicle 10, and vehicle sensors 26 that detect the traveling state of the host vehicle 10.

Among the external environment sensors 18, there are included one or more cameras 28 that capture images of the external environment, and one or more radar devices 30 and one or more LIDAR devices 32 that detect the distance between the host vehicle 10 and other surrounding objects, as well as the relative speed between the host vehicle 10 and the surrounding objects. In the communication device 20, there are included a first communication device 34 that performs inter-vehicle communications with communication devices 102 disposed in the other vehicles 100, and a second communication device 36 that performs road-to-vehicle communications with communication devices 122 provided in infrastructure such as the travel path 120 and a railroad crossing 140. The first communication device 34 acquires other vehicle information, and the second communication device 36 acquires railroad crossing information and road information. The navigation device 24 includes a satellite navigation system and a self-contained navigation system. The vehicle sensors 26 include a vehicle speed sensor, an acceleration sensor, a yaw rate sensor, an inclination sensor, and the like, none of which are shown.

[1.2. Output System Device Group 16]

The output system device group 16 includes a driving force output device 40, a steering device 42, a braking device 44, a notification device 46, an illumination device 48, and an alarm device 49. The driving force output device 40 includes a driving force output ECU and a drive source such as an engine or a driving motor. The driving force output device 40 generates a driving force in accordance with an operation of an accelerator pedal performed by the vehicle occupant, or a driving control instruction output from the vehicle control device 12. The steering device 42 includes an electric power steering system (EPS) ECU and an EPS actuator. The steering device 42 generates a steering force in accordance with an operation of the steering wheel performed by the vehicle occupant, or a steering control instruction output from the vehicle control device 12. The braking device 44 includes a brake ECU and a brake actuator. The braking device 44 generates a braking force in accordance with an operation of the brake pedal performed by the vehicle occupant, or a braking control instruction output from the vehicle control device 12. The notification device 46 includes a notification ECU, and an information transmission device (a display device, an audio device, a haptic device, etc.). The notification device 46 issues a notification with respect to the vehicle occupant in accordance with a notification instruction output from the vehicle control device 12 or another ECU. The illumination device 48 includes headlights, and the alarm device 49 includes a horn.

[1.3. Vehicle Control Device 12]

Figure 2:
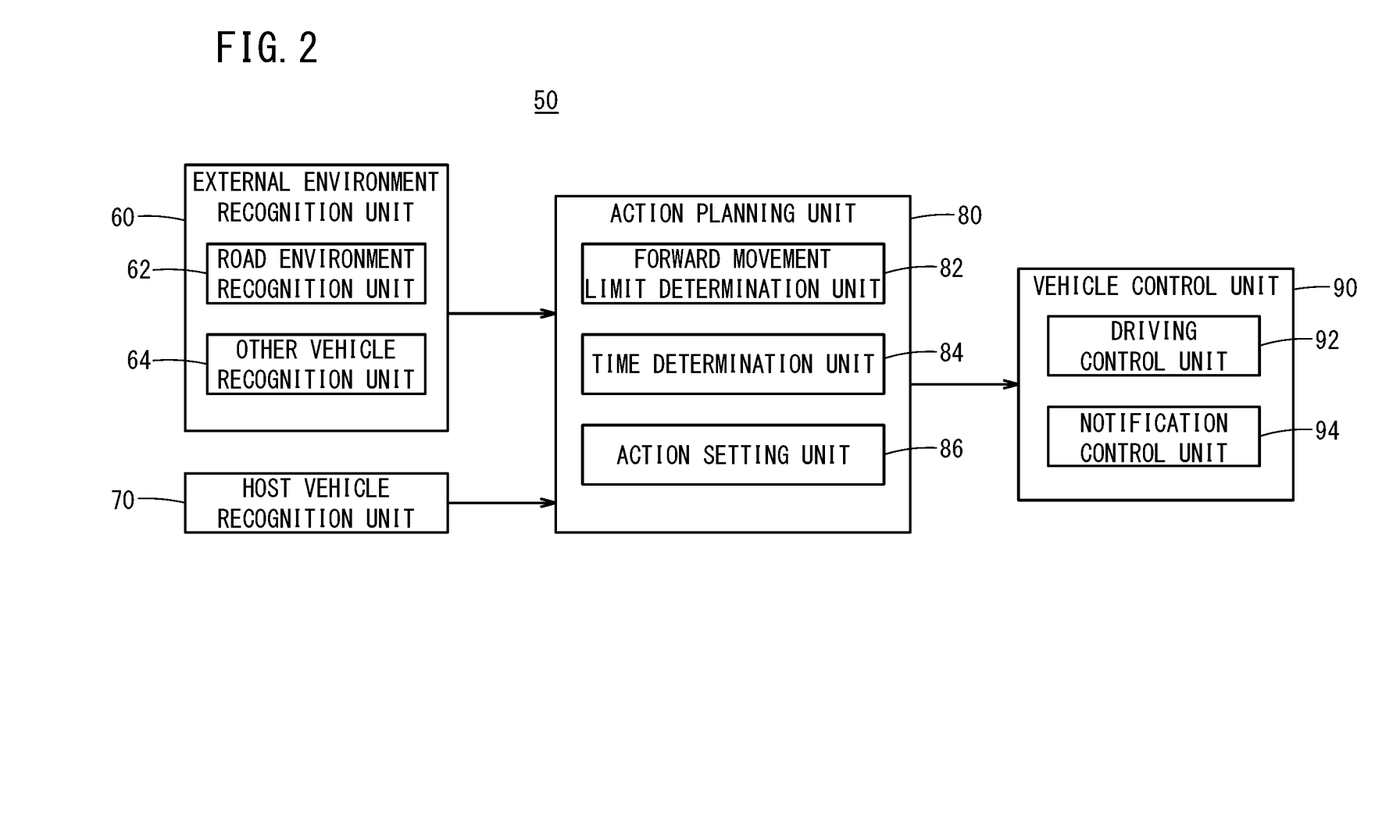
FIG. 2 is a functional block diagram of a computation device provided in the vehicle control device.

The vehicle control device 12 comprises an ECU, and includes a computation device 50 such as a processor, and a storage device 52 such as a ROM and a RAM. The vehicle control device 12 realizes various functions by the computation device 50 executing programs stored in the storage device 52. As shown in FIG. 2, the computation device 50 functions as an external environment recognition unit 60, a host vehicle position recognition unit 70, an action planning unit 80, and a vehicle control unit 90.

On the basis of information output from the external environment sensors 18, the communication device 20, and the MPU 22, the external environment recognition unit 60 recognizes the circumstances and objects in the vicinity around the host vehicle 10. The external environment recognition unit 60 includes a road environment recognition unit 62, and an other-vehicle recognition unit 64. On the basis of image information from the cameras 28, map information from the MPU 22, railway crossing information and/or road information acquired by the second communication device 36, the road environment recognition unit 62 recognizes the road environment in general, for example, the road shape, the road width, the positions of lane markings, the number of lanes, the lane width, and the like. Furthermore, the road environment recognition unit 62 recognizes the existence, the type, the size, and the boundary position of a specified area {a railroad crossing 140 (see FIG. 4, etc.), an intersection 160 (see FIG. 6), a movable bridge, or the like} which is located in the travel direction 106 (see FIG. 4, etc.) of the host vehicle 10, and is switched between a passage capable state and a passage incapable state, the open or closed state of a railroad crossing gate 142 (see FIG. 4), and an illuminated state of a traffic light 162 (see FIG. 6 etc.), or the like. Based on image information from the cameras 28 and/or the detection information from the radar devices 30 and the LIDAR devices 32, the other-vehicle recognition unit 64 recognizes the existence, the position, the size, the type, and the travel direction of other vehicles 100 which are traveling or stopped in the vicinity of the host vehicle 10, together with recognizing the distance and the relative speed between the host vehicle 10 and the other vehicles 100.

Based on information output from the MPU 22 and the navigation device 24, the host vehicle position recognition unit 70 recognizes the position of the host vehicle 10 and the map information around the position thereof.

The action planning unit 80 determines the traveling situation of the host vehicle 10, and formulates behaviors of the host vehicle 10, on the basis of the recognition results of the external environment recognition unit 60 and the host vehicle position recognition unit 70, and the detection results of the vehicle sensors 26. The action planning unit 80 includes a forward movement limit determination unit 82, a time determination unit 84, and an action setting unit 86. Based on the recognition results of the external environment recognition unit 60, the forward movement limit determination unit 82 determines whether or not to execute the forward movement limit of the host vehicle 10. For example, the present or absence of an intersecting road 124 (see FIG. 4, etc.), the presence or absence of an entering vehicle 100a (see FIG. 5), whether or not the railroad crossing 140 or the intersection 160 are passable, and whether or not a traffic jam is occurring are determined, and based on such a determination result, it is determined whether or not to execute the forward movement limit. The limit on forward movement of the present embodiment is a control for delaying the progress of the host vehicle 10 in the forward direction, and includes a travel control for automatically carrying out deceleration and stoppage of the host vehicle 10, and a notification control to prompt the vehicle occupant to decelerate or stop the host vehicle. Based on the railroad crossing information and the road information acquired by the second communication device 36, the time determination unit 84 determines a first time period t1 which is the time period from a current point in time until the railroad crossing 140 and the traffic light 162 transition to the passage incapable state. Further, based on the length of the railroad crossing 140 or the intersection 160 and the vehicle speed of the host vehicle 10, a second time period t2 required for the host vehicle 10 to pass through the railroad crossing 140 or the intersection 160 is determined. The action setting unit 86 sets actions to be taken by the host vehicle 10, on the basis of the recognition results of the external environment recognition unit 60 and the host vehicle position recognition unit 70, and the determination results of the forward movement limit determination unit 82 and the time determination unit 84. In the case that the host vehicle 10 is made to travel, a travel trajectory (target travel trajectory) and a vehicle speed (target vehicle speed) targeted by the host vehicle 10 are set.

Based on the determination results of the action planning unit 80, the vehicle control unit 90 calculates control command values with respect to the output device group. The vehicle control unit 90 includes a driving control unit 92 that carries out the travel control, and a notification control unit 94 that performs the notification control. The driving control unit 92 generates control instructions in accordance with the target travel trajectory and the target vehicle speed set by the action planning unit 80, and outputs the control instructions to the driving force output device 40, the steering device 42, and the braking device 44. Further, the driving control unit 92 outputs operation instructions with respect to the illumination device 48 and the alarm device 49. The notification control unit 94 generates notification instructions with respect to the vehicle occupant, and outputs the notification instructions to the notification device 46.

Returning to FIG. 1, the description of the vehicle control device 12 will be continued. Apart from the various programs executed by the computation device 50, the storage device 52 stores numerical values used for comparisons and determinations made in the respective processes.

[2. Operations of Vehicle Control Device 12]

Figure 4:
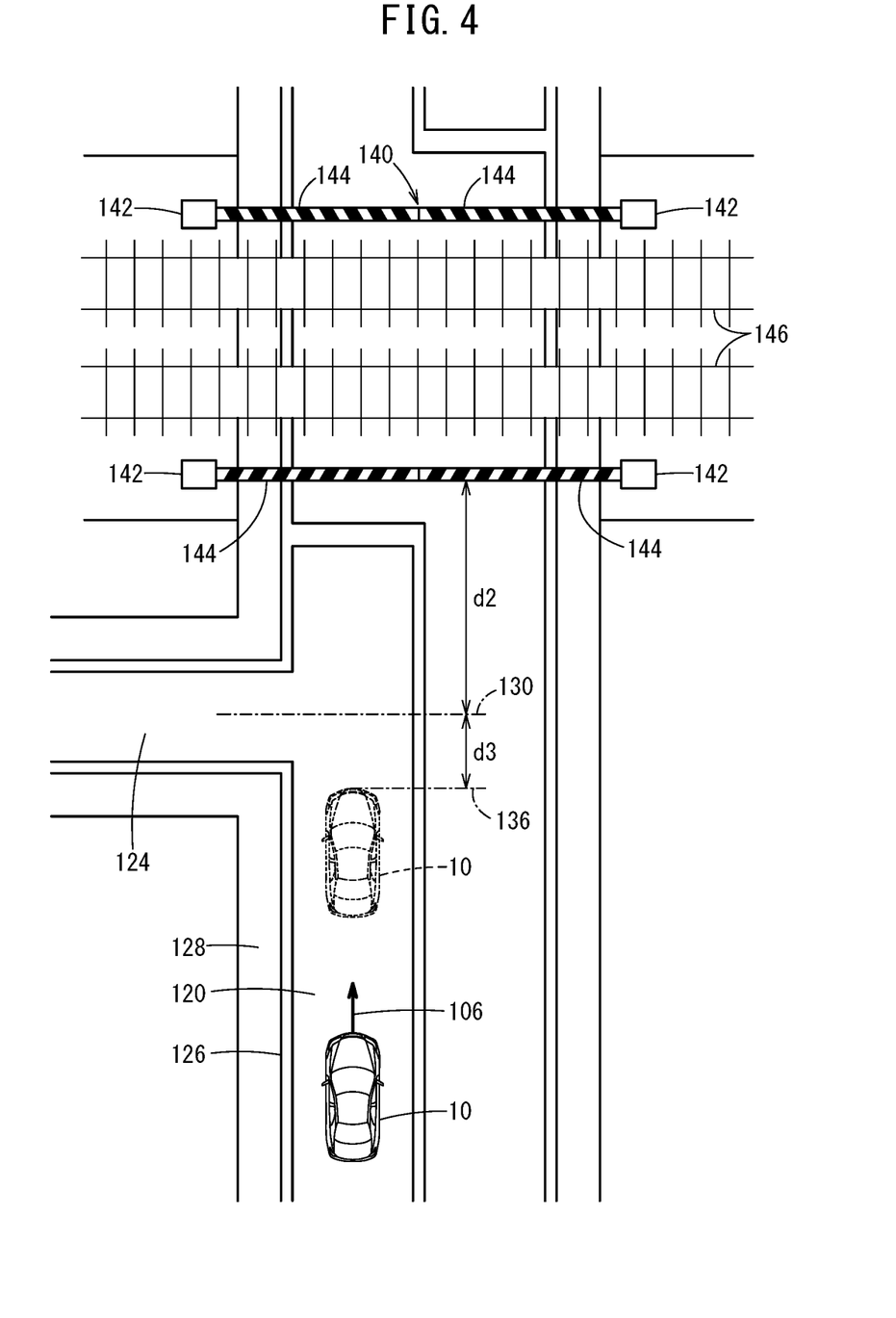
FIG. 4 is a diagram for explaining an embodiment in which a railroad crossing and an intersection exist in front of the host vehicle.
Figure 5:
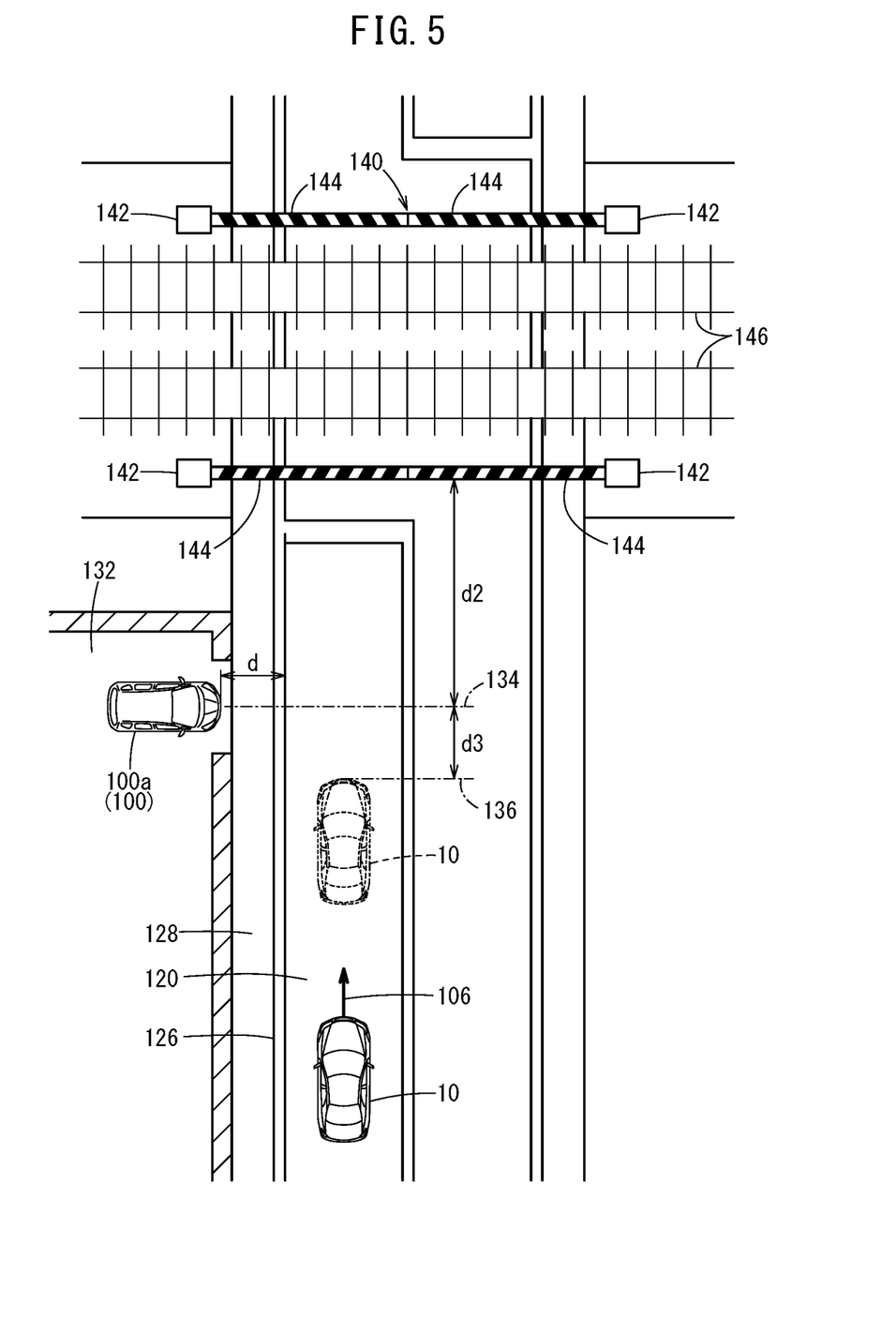
FIG. 5 is a diagram for explaining an embodiment in which a railroad crossing and an entering vehicle exist in front of the host vehicle.
Figure 6:
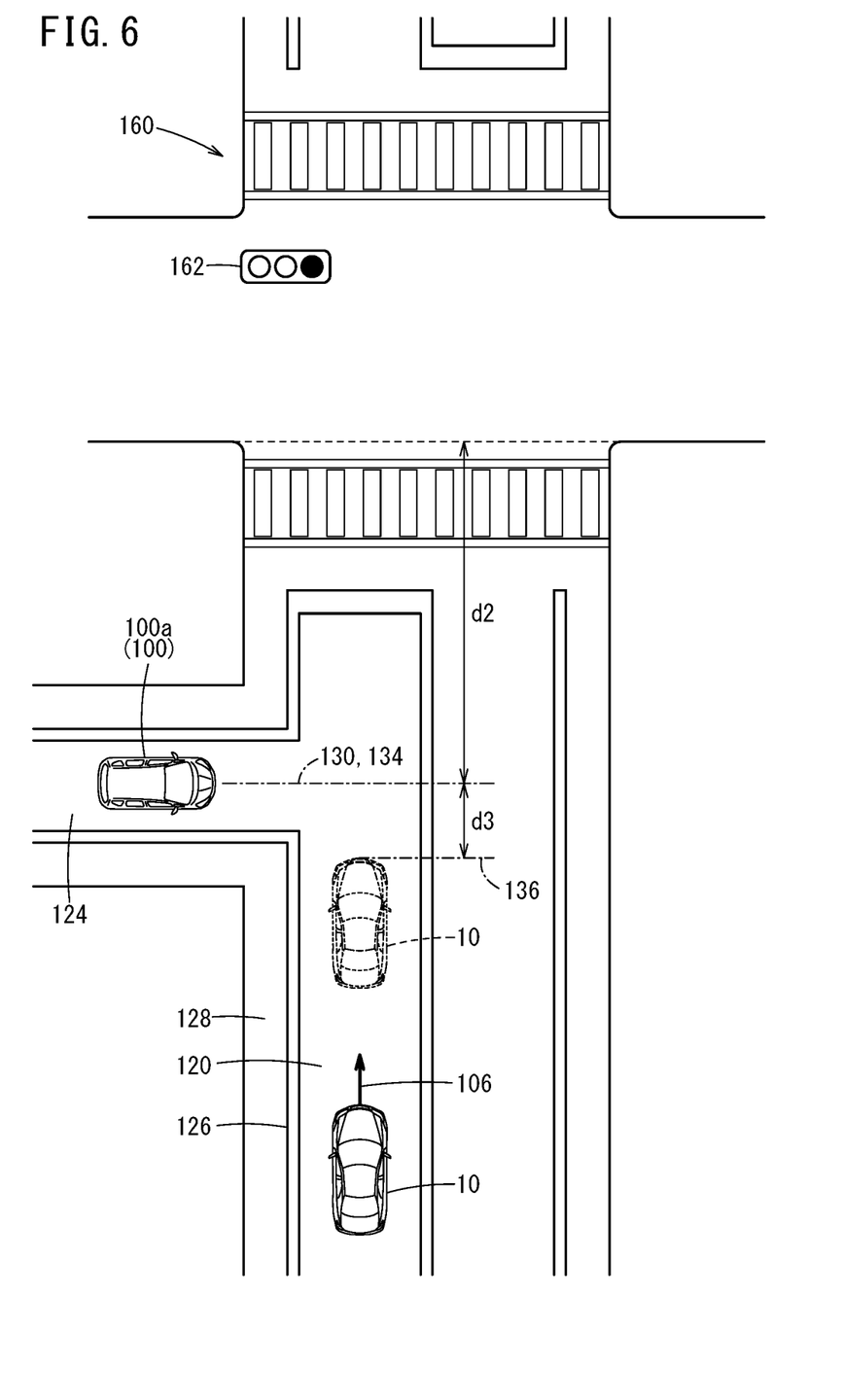
FIG. 6 is a diagram for explaining an embodiment in which an intersection and an intersecting road or an entering vehicle exist in front of the host vehicle.
Figure 8:
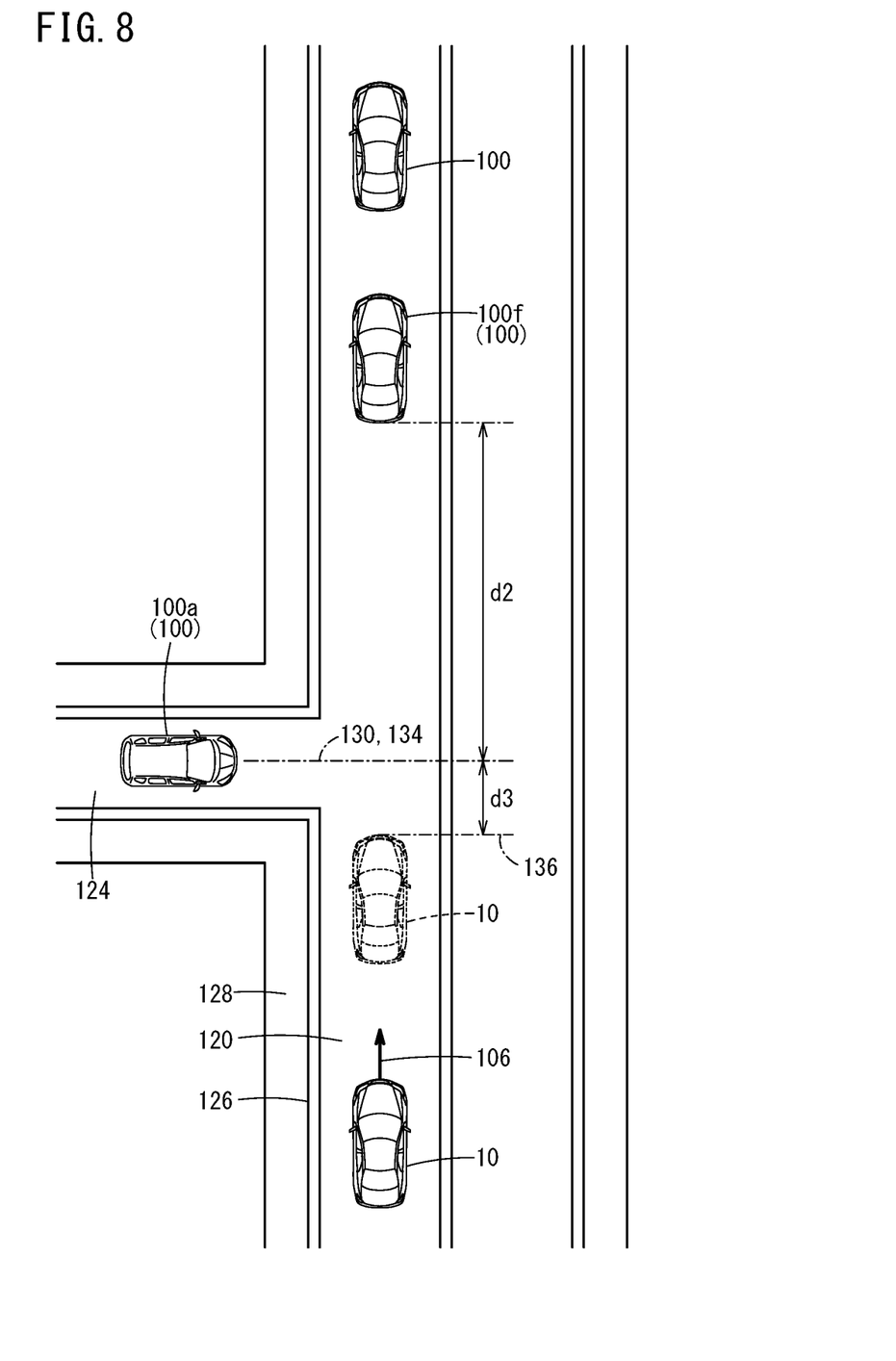
FIG. 8 is a diagram for explaining an embodiment in which a traffic jam is occurring in front of the host vehicle.

The processes performed by the vehicle control device 12 will now be described. In the case that an event that limits traveling of the host vehicle 10 occurs in front of the host vehicle 10, the vehicle control device 12 imparts an opportunity of passage with respect to an entering vehicle 100a intending to enter into the travel path 120 in front of the host vehicle 10. Events that limit traveling of the host vehicle 10 are the railroad crossing 140 being placed in a passage incapable state as shown in FIGS. 4 and 5, an intersection 160 being placed in a passage incapable state as shown in FIG. 6, and that a traffic jam is occurring as shown in FIG. 8, and the like.

[2.1. Process When Railroad Crossing 140 Exists in Front of Host Vehicle 10]

An example of a process performed by the vehicle control device 12 will be described with reference to FIG. 3. In this instance, as shown in FIG. 4 and FIG. 5, a situation is assumed in which the railroad crossing 140 is in a passage incapable state in front of the host vehicle 10. The process described below is repeatedly executed while the electric power of the host vehicle 10 is turned on.

In step S1, the external environment recognition unit 60 receives the most recent information output from the input system device group 14, and recognizes the external environment.

In step S2, the road environment recognition unit 62 recognizes the presence or absence of an intersecting road 124 that intersects with the travel path 120 in front of the host vehicle 10. Based on image information from the cameras 28, the road environment recognition unit 62 may recognize the presence or absence of the intersecting road 124 by identifying a lane marking 126 at an end of the travel path 120 and a break line of a sidewalk 128, road signs, structures on a side of the travel path 120, and the like, or may recognize the presence or absence of the intersecting road 124 from the map information. At this time, an intersection at which the traffic light 162 is installed is excluded from the intersecting road 124. The road environment recognition unit 62 recognizes an intersecting position 130 between the travel path 120 and the intersecting road 124. In the case that the road environment recognition unit 62 recognizes the intersecting road 124 (step S2: YES), the process transitions to step S4. On the other hand, in the case that the road environment recognition unit 62 does not recognize the intersecting road 124 (step S2: NO), the process transitions to step S3.

Upon transitioning from step S2 to step S3, the other-vehicle recognition unit 64 recognizes the presence or absence of an entering vehicle 100a. As shown in FIG. 5, there may be a case in which an entering vehicle 100a exists, which intends to enter into the travel path 120 from a parking lot 132 provided along the travel path 120. The other-vehicle recognition unit 64 recognizes the presence or absence of the entering vehicle 100a that intends to enter into the travel path 120 from a region (which does not include the side of the oncoming lane) along the travel path 120. The other-vehicle recognition unit 64 recognizes as the entering vehicle 100a another vehicle 100 whose distance d from the travel path 120 is less than or equal to a first predetermined distance d1, and the front portion of which is oriented toward the travel path 120. For example, the distance d between the travel path 120 and the other vehicle 100 may be specified, for example, as a distance between the other vehicle 100 and the lane marking 126 at the end of the travel path 120, or may be specified as a distance between the sidewalk 128 and the other vehicle 100. Another vehicle 100 traveling toward the travel path 120 in a region along the travel path 120 may also be recognized as the entering vehicle 100a. In the case that the other-vehicle recognition unit 64 recognizes the entering vehicle 100a (step S3: YES), the process transitions to step S4. At this time, the other-vehicle recognition unit 64 recognizes as an entry position 134 the intersecting region between the travel direction of the entering vehicle 100a and the travel path 120. On the other hand, in the case that the other-vehicle recognition unit 64 does not recognize the entering vehicle 100a (step S3: NO), the process transitions to step S11.

Upon transitioning from step S2 or step S3 to step S4, the road environment recognition unit 62 recognizes whether or not there is the railroad crossing 140 in a region, which is a region on the forward side of the travel direction 106 from the intersecting position 130 or the entry position 134, and lies within a second predetermined distance d2 from the intersecting position 130 or the entry position 134. The road environment recognition unit 62 may recognize the presence or absence and the position of the railroad crossing 140 by identifying a railroad crossing gate 142 or railroad tracks 146 based on the image information from the cameras 28, or may recognize the presence or absence and the position of the railroad crossing 140 from the map information. In the case that the road environment recognition unit 62 recognizes the railroad crossing 140 (step S4: YES), the process transitions to step S5. On the other hand, in the case that the road environment recognition unit 62 does not recognize the railroad crossing 140 (step S4: NO), the process transitions to step S11.

Upon transitioning from step S4 to step S5, the road environment recognition unit 62 recognizes the state of the railroad crossing 140. The road environment recognition unit 62 recognizes the passage incapable state in the case that a gate 144 made up of a blocking rod or the like is located at a position lower than a predetermined height, or in the case that the gate 144 is moving downward, and recognizes the passage capable state in the case that the gate 144 is located at a position higher than the predetermined height, or in the case that the gate 144 is moving upward. The state of the railroad crossing 140 may be recognized based on the presence or absence of lights or the presence or absence of sounds of a railroad crossing alarm. Alternatively, the state of the railroad crossing 140 may be recognized on the basis of railroad crossing information acquired by the second communication device 36. In the case that the road environment recognition unit 62 recognizes a passage incapable state of the railroad crossing 140 (step S5: YES), the process transitions to step S6. On the other hand, in the case that the road environment recognition unit 62 recognizes a passage capable state of the railroad crossing 140 (step S5: NO), the process transitions to step S8.

Upon transitioning from step S5 to step S6, the forward movement limit determination unit 82 determines to execute, as the forward movement limit, a stop control to stop the host vehicle 10. At this time, the forward movement limit determination unit 82 sets a stop position 136, which is separated by a third predetermined distance d3 on an opposite direction side of the travel direction 106 from the intersecting position 130 or the entry position 134. For example, the third predetermined distance d3 is set beforehand or at each time, in a manner so that a space is secured to an extent that allows a virtual vehicle (which may be the entering vehicle 100a) to be capable of crossing the travel path 120. The action setting unit 86 sets the travel trajectory and the vehicle speed for stopping the host vehicle 10, in accordance with the stop position 136 and the determination made by the forward movement limit determination unit 82. The driving control unit 92 calculates command values for deceleration and a steering amount in order to cause the host vehicle 10 to travel in accordance with the travel trajectory and the vehicle speed, and to stop at the stop position 136. In addition, the command values are output to the driving force output device 40, the steering device 42, and the braking device 44 to thereby execute the forward movement limit of the host vehicle 10.

In step S7, the driving control unit 92, in accordance with the forward movement limit, also executes a signal output control to output a signal with respect to the entering vehicle 100a to prompt entry thereof into the travel path 120. The signal output control is executed in the case that the entering vehicle 100a is recognized by the other-vehicle recognition unit 64. At this time, the driving control unit 92 outputs a predetermined operation instruction to the illumination device 48 and/or the alarm device 49 to thereby output the signal.

On the other hand, upon transitioning from step S5 to step S8, from the railroad crossing information acquired by the second communication device 36, the time determination unit 84 acquires the time at which the railroad crossing 140 will transition to the next passage incapable state, and calculates the first time period t1 which is the time period from the current point in time until the railroad crossing 140 transitions to the passage incapable state.

In step S9, the time determination unit 84 calculates the second time period t2 required for the host vehicle 10 to pass through the railroad crossing 140. For example, the position information of the host vehicle 10 is acquired from the host vehicle position recognition unit 70, and the position information of the entrance and exit of the railroad crossing 140 is acquired from the image information recognized by the external environment recognition unit 60 or the map information from the MPU 22. In addition, the time period required from the present position to the entrance of the railroad crossing 140 is calculated by dividing the distance from the current position of the host vehicle 10 to the entrance of the railroad crossing 140 by the current vehicle speed, and together therewith, the time period from the entrance to the exit of the railroad crossing 140 is calculated by dividing the distance from the entrance to the exit of the railroad crossing 140 by the predetermined vehicle speed. Then, the second time period t2 is calculated by adding both of the time periods.

In step S10, the time determination unit 84 compares the first time period t1 with the second time period t2. In the case that the first time period t1 is less than the second time period t2 (step S10: YES), or stated otherwise, in the case that the host vehicle 10 cannot pass through the railroad crossing 140 before the railroad crossing 140 changes from the passage capable state to the passage incapable state, the process transitions to step S6. On the other hand, in the case that the first time period t1 is greater than or equal to the second time period t2 (step S10: NO), or stated otherwise, in the case that the host vehicle 10 is capable of passing through the railroad crossing 140 before the railroad crossing 140 changes from the passage capable state to the passage incapable state, the process transitions to step S11.

Upon transitioning from any one of step S3, step S4, or step S10 to step S11, the forward movement limit determination unit 82 determines that the forward movement limit should not be executed. In this case, the host vehicle 10 continues to proceed forward.

[2.2. Process if an Intersection 160 Where a Traffic Light 162 is Installed Exists in Front of the Host Vehicle 10]

As shown in FIG. 6, there may be an entering vehicle 100a or an intersecting road 124 where a traffic light 162 is not installed, on an opposite direction side of the travel direction 106 of the host vehicle 10 from the intersection 160 where the traffic light 162 is installed. Even in such a situation, it is possible to apply the processing described in section [2.1] above. However, in step S4, step S5, step S8, and step S9 of FIG. 3, the following processes are performed.

In step S4, the road environment recognition unit 62 recognizes whether or not there is an intersection 160 in a region, which is a region on the forward side of the travel direction 106 from the intersecting position 130 or the entry position 134, and lies within the second predetermined distance d2 from the intersecting position 130 or the entry position 134. The road environment recognition unit 62 may recognize the presence or absence and the position of the intersection 160 by identifying the traffic light 162 based on image information from the cameras 28, or may recognize the presence or absence and the position of the intersection 160 from the map information.

In step S5, the road environment recognition unit 62 recognizes the state of the intersection 160. The road environment recognition unit 62 recognizes the passage incapable state in the event that the traffic light 162 outputs a light signal that does not enable passage, and recognizes the passage capable state in the event that the traffic light 162 outputs a light signal that enables passage. Alternatively, the state of the intersection 160 may be recognized on the basis of road information received by the second communication device 36.

In step S8, from the road information acquired by the second communication device 36, the time determination unit 84 acquires the time at which the intersection 160 transitions to the next passage incapable state, and calculates the first time period t1 which is the time period from the current point in time until the intersection 160 transitions to the passage incapable state.

In step S9, the time determination unit 84 calculates the second time period t2 required for the host vehicle 10 to pass through the intersection 160. For example, the position information of the host vehicle 10 is acquired from the host vehicle position recognition unit 70, and the position information of the exit of the intersection 160 is acquired from the image information recognized by the external environment recognition unit 60 or the map information from the MPU 22. In addition, the second time period t2 from the present position until arriving at the exit of the intersection 160 is calculated by dividing the distance from the current position of the host vehicle 10 to the exit of the intersection 160 by the current vehicle speed.

[2.3. Process When Traffic Jam Exists in Front of Host Vehicle 10]

An example of a process performed by the vehicle control device 12 will be described with reference to FIG. 7. In this instance, as shown in FIG. 8, a situation is assumed in which a traffic jam is occurring in front of the host vehicle 10. The process described below is repeatedly executed while the electric power of the host vehicle 10 is turned on.

Figure 3:
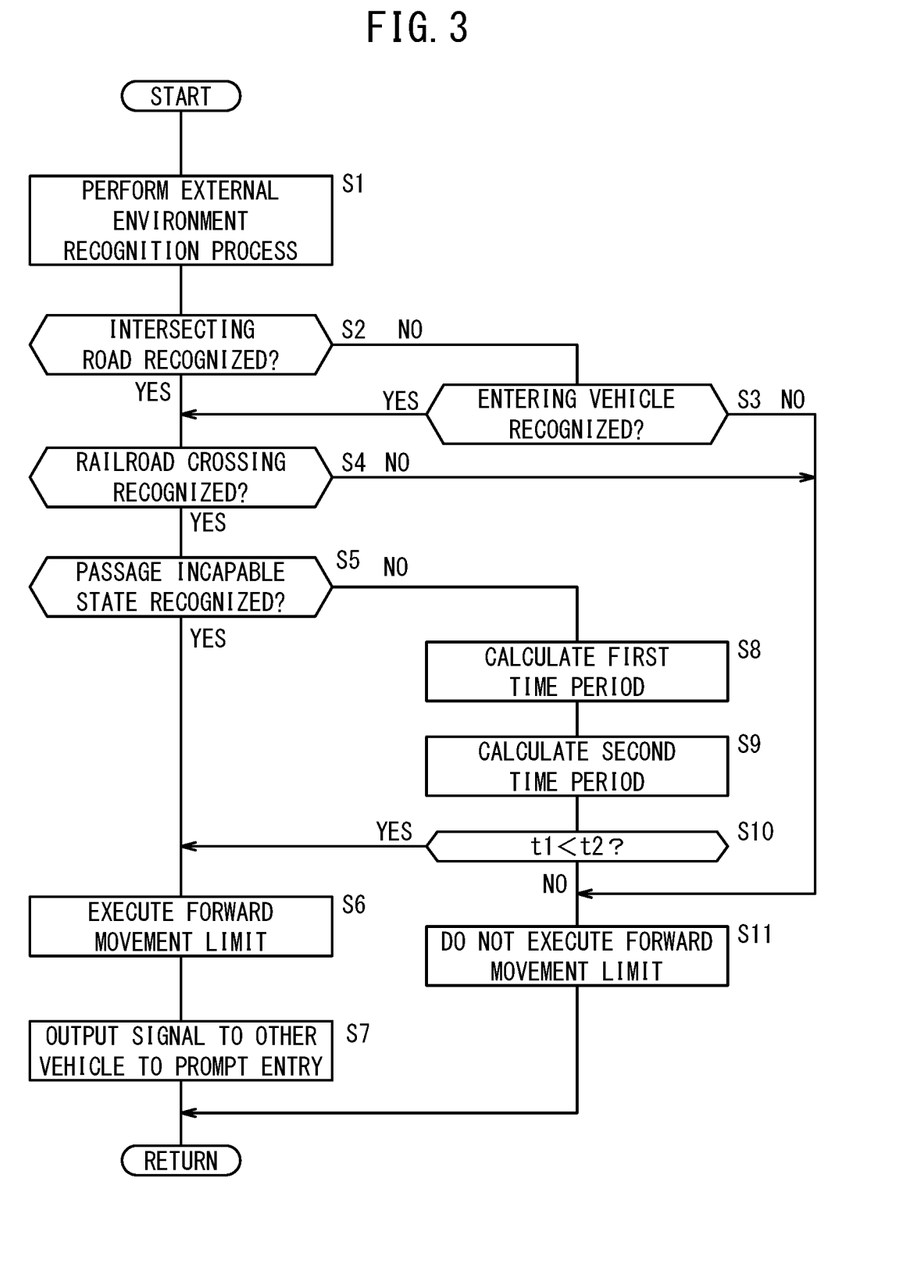
FIG. 3 is a flowchart of a process for determining whether or not to execute a forward movement limit in the event that there is a railroad crossing in front of the host vehicle.
Figure 7:
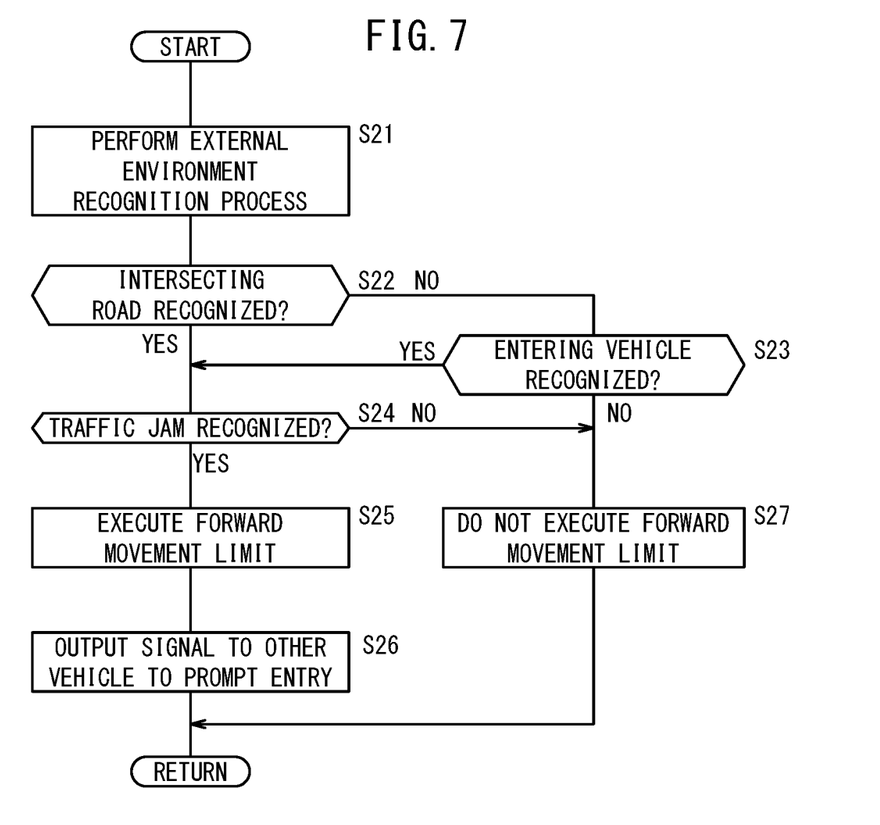
FIG. 7 is a flowchart of a process for determining whether or not to execute a forward movement limit in the event that a traffic jam is occurring in front of the host vehicle.

The processes of steps S21 to S23 and steps S25 to S27 shown in FIG. 7 correspond to the processes of steps S1 to S3, step S6, step S7, and step S11 shown in FIG. 3. Moreover, in the series of processes shown in FIG. 7, the processes from step S8 to step S10 shown in FIG. 3 do not exist. Hereinafter, a description will be given of the process of step S24 in place of the process of step S4 shown in FIG. 3, and description of other processes apart therefrom will be omitted.

Upon transitioning from step S22 or step S23 to step S24, the other-vehicle recognition unit 64 recognizes whether or not a traffic jam is occurring on the forward direction side in the travel direction 106 of the host vehicle 10 from the intersecting position 130 or the entry position 134. For example, the other-vehicle recognition unit 64 recognizes whether or not a preceding vehicle 100f is stopped in a region, which is a region on the forward side of the travel direction 106 from the intersecting position 130 or the entry position 134, and lies within the second predetermined distance d2 from the intersecting position 130 or the entry position 134. The fact that a preceding vehicle 100f is stopped can be recognized on the basis of the detection result of the radar devices 30 or the LIDAR devices 32, or can also be recognized on the basis of image information of a brake lamp of the preceding vehicle 100f captured by the cameras 28. Further, such a fact can also be recognized on the basis of other vehicle information acquired by the first communication device 34. In the case that the other-vehicle recognition unit 64 recognizes the traffic jam (step S24: YES), the process transitions to step S25. On the other hand, in the case that the other-vehicle recognition unit 64 does not recognize the traffic jam (step S24: NO), the process transitions to step S27.

[2.4. Process of Canceling Forward Movement Limit]

Figure 9:
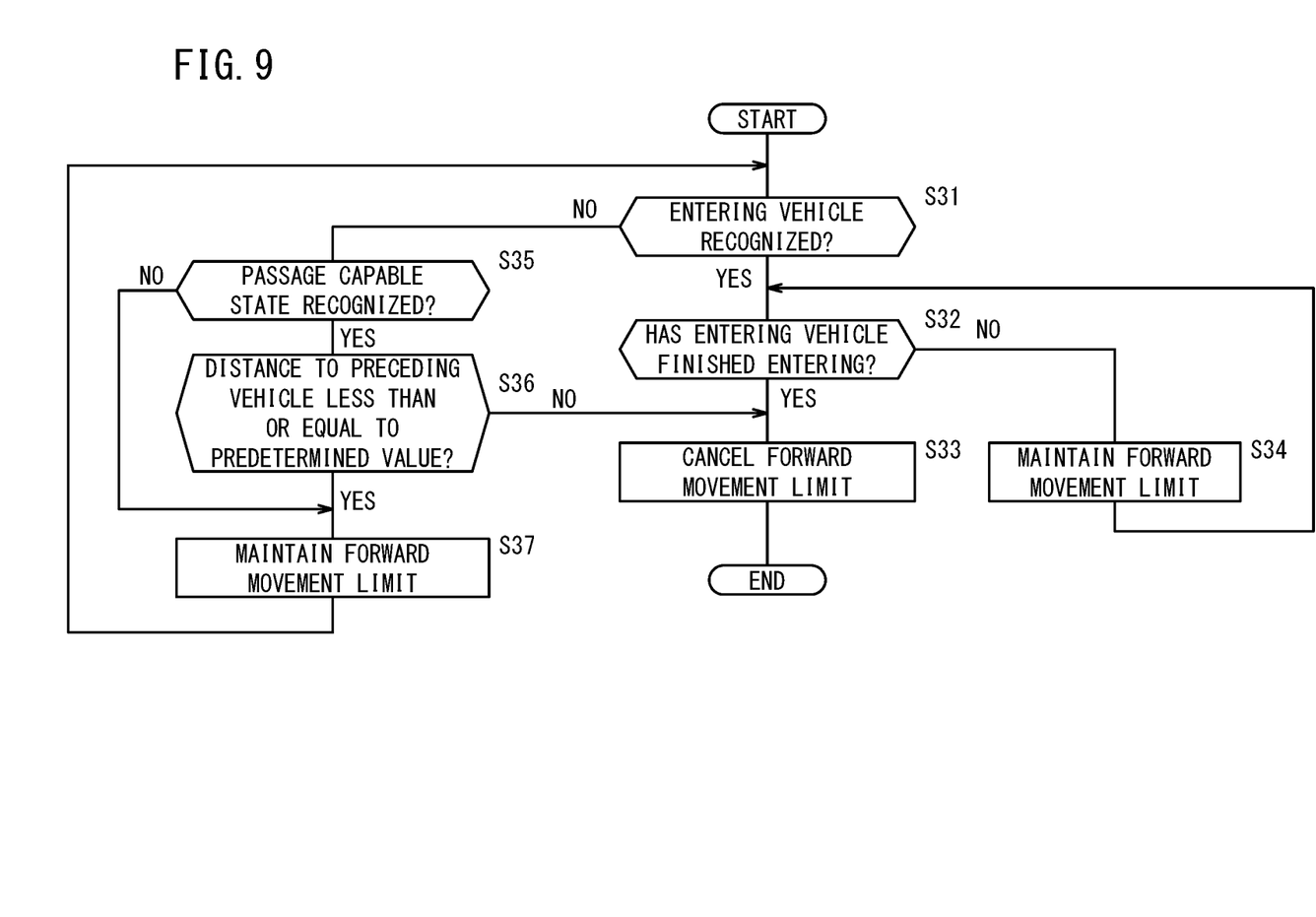
FIG. 9 is a flowchart of a process for determining whether or not to cancel the forward movement limit.

An example of a process of canceling the forward movement limit will be described with reference to FIG. 9. The process shown in FIG. 9 is a process performed in the event that the host vehicle 10 is executing the forward movement limit before the railroad crossing 140 or the intersection 160 (step S6 of FIG. 3).

In step S31, the other-vehicle recognition unit 64 recognizes whether or not an entering vehicle 100a exists on the forward direction side of the travel direction 106. In the case that the other-vehicle recognition unit 64 recognizes the entering vehicle 100a (step S31: YES), the process transitions to step S32. On the other hand, in the case that the other-vehicle recognition unit 64 does not recognize the entering vehicle 100a (step S31: NO), the process transitions to step S35.

Upon transitioning from step S31 to step S32, the other-vehicle recognition unit 64 recognizes whether or not the entering vehicle 100a has finished entering into the travel path 120. In the case that the other-vehicle recognition unit 64 recognizes that the entering vehicle 100a has finished entering into the travel path 120 (step S32: YES), the process transitions to step S33. On the other hand, in the case that the other-vehicle recognition unit 64 does not recognize that the entering vehicle 100a has finished entering into the travel path 120 (step S32: NO), the process transitions to step S34.

Upon transitioning from step S32 to step S33, the forward movement limit determination unit 82 determines to cancel the forward movement limit. The action setting unit 86 resumes a normal control in accordance with the determination made by the forward movement limit determination unit 82. The vehicle control unit 90 cancels the forward movement limit, and calculates command values for the normal travel control. In the case that the host vehicle 10 is stopped yet forward movement thereof is possible, the host vehicle 10 is made to proceed forward in the travel direction 106.

Upon transitioning from step S32 to step S34, the forward movement limit determination unit 82 determines to maintain the forward movement limit. The action setting unit 86 maintains control of the forward movement limit in accordance with the determination made by the forward movement limit determination unit 82.

Upon transitioning from step S31 to step S35, the road environment recognition unit 62 recognizes whether the railroad crossing 140 or the intersection 160 is in a passage capable state or a passage incapable state. In the case that the road environment recognition unit 62 recognizes the passage capable state (step S35: YES), the process transitions to step S36. On the other hand, in the case that the road environment recognition unit 62 recognizes the passage incapable state (step S35: NO), the process transitions to step S37.

Upon transitioning from step S35 to step S36, the other-vehicle recognition unit 64 recognizes the distance to the preceding vehicle 100f, and determines whether or not the distance remains less than or equal to a predetermined value. When the preceding vehicle 100f moves forward, the distance between the host vehicle 10 and the preceding vehicle 100f increases. At this time, it is necessary for the host vehicle 10 to proceed in following relation to the preceding vehicle 100f. In the case that the distance to the preceding vehicle 100f remains less than or equal to the predetermined value (step S36: YES), the process transitions to step S37 and the forward movement limit is maintained, whereupon the process returns to step S31. On the other hand, in the case that the distance to the preceding vehicle 100f is greater than the predetermined value (step S36: NO), the process transitions to step S33, and the forward movement limit is canceled.

As noted above, the process shown in FIG. 9 is a process performed in the event that the host vehicle 10 is executing the forward movement limit before the railroad crossing 140 or the intersection 160 (step S6 of FIG. 3). On the other hand, in the case that the host vehicle 10 executes the forward movement limit before a traffic jam (step S25 of FIG. 7), the process shown in FIG. 9 is carried out in a form in which step S35 is omitted.

[3. Modifications]

Figure 10:
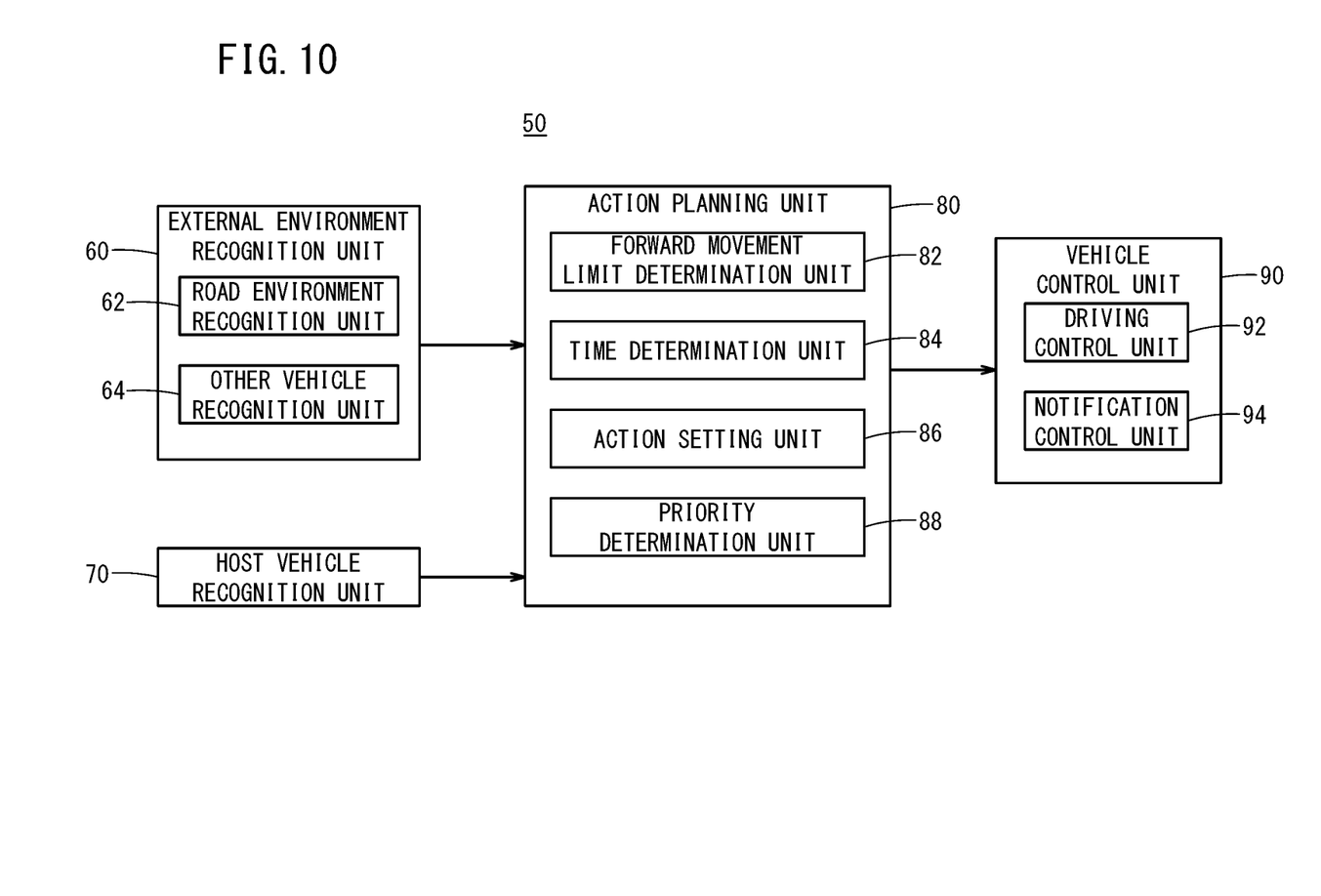
FIG. 10 is a functional block diagram of a computation device provided in a modified example of the vehicle control device.

As shown in FIG. 10, the action planning unit 80 may include a priority determination unit 88. On the basis of the map information stored in the MPU 22, the priority determination unit 88 determines a priority of the travel path 120 and a priority of the intersecting road 124 in relation to traffic. The determination made by the priority determination unit 88 is performed in the event that the intersecting road 124 is recognized in the process of step S2 shown in FIG. 3 and the process of step S22 shown in FIG. 7. In this case, if it is determined that the recognition result by the external environment recognition unit 60 and the determination result of the priority determination unit 88, and more specifically, that the travel path 120 is of a higher degree of priority than the intersecting road 124, the forward movement limit determination unit 82 determines to execute the forward movement limit.

Further, in addition to the processing shown in FIGS. 3 and 7, the forward movement limit determination unit 82 may determine to execute the forward movement limit, in the case that a stop line is not recognized by the road environment recognition unit 62 on an opposite direction side of the travel direction 106 from the intersecting position 130.

Further, instead of performing a stop control as the forward movement limit, a deceleration control may be performed. Further, when the forward movement limit is carried out, the action setting unit 86 may output a notification instruction with respect to the notification control unit 94, and the notification device 46 may issue a notification to the vehicle occupant to stop or decelerate.

Further, the above-described embodiments can be combined in any appropriate manner. For example, the forward movement limit may be carried out in the case that the intersecting road 124 is recognized and an entering vehicle 100a is recognized, and in the case that the railroad crossing 140 or the like is in the passage incapable state or a traffic jam is occurring.

[4. Summary of Present Embodiment]

The vehicle control device 12 is equipped with the external environment recognition unit 60 that recognizes the state of the external environment in the vicinity of the host vehicle 10, the forward movement limit determination unit 82 that determines whether or not to limit forward movement of the host vehicle 10 on the basis of a recognition result of the external environment recognition unit 60, and the vehicle control unit 90 that carries out the forward movement limit on the basis of the determination result of the forward movement limit determination unit 82. The forward movement limit determination unit 82 determines to execute the forward movement limit (step S6, etc.) in the case it is recognized by the external environment recognition unit 60 (road environment recognition unit 62, other-vehicle recognition unit 64) that there is an intersecting road 124 intersecting with a travel path 120 of the host vehicle 10 in front of the host vehicle 10 or an entering vehicle 100a attempting to enter in front of the host vehicle 10 (step S2: YES or step S3: YES of FIG. 3), and further, an event is occurring that limits traveling of the host vehicle 10 on a more forward side of the travel direction 106 of the host vehicle 10 than an intersecting position 130 between the travel path 120 and the intersecting road 124 or the entry position 134 of the entering vehicle 100a (step S5 of FIG. 3: YES). In the case it is determined by the forward movement limit determination unit 82 that the forward movement limit is to be executed, the vehicle control unit 90 performs the forward movement limit (step S6, etc.) on a more opposite direction side of the travel direction than the intersecting position 130 or the entry position 134.

In accordance with the above configuration, by limiting forward movement of the host vehicle on a more opposite direction side of the travel direction 106 than the intersecting position 130 between the travel path 120 and the intersecting road 124 or the entry position 134 of the entering vehicle 100a, an opportunity of passage can be imparted with respect to the entering vehicle 100a attempting to enter into the travel path 120, and thus it becomes possible to smooth the flow of traffic. Further, since the forward movement limit is performed in the case that an event is occurring that limits traveling of the host vehicle 10 on the forward side of the travel direction 106, or stated otherwise, in the case that the host vehicle 10 is incapable of proceeding forward, substantially no disadvantage occurs in which forward movement of the host vehicle 10 is delayed due to the forward movement limit. In other words, there is no influence on the forward movement of the host vehicle 10. Further, by carrying out the forward movement limit, unnecessary acceleration of the host vehicle 10 is suppressed, and therefore, energy consumption is reduced.

As the forward movement limit, the vehicle control unit 90 performs a travel control to automatically decelerate or stop the host vehicle 10, or a notification control to prompt a vehicle occupant to decelerate or stop the host vehicle 10.

In accordance with the above configuration, it is possible to provide room for the entering vehicle 100a.

The forward movement limit determination unit 82 determines to execute the forward movement limit, in the case it is recognized by the external environment recognition unit 60 that the intersecting road 124 or the entering vehicle 100a is on the forward side of the travel direction 106, and further, the railroad crossing 140 of a passage incapable state, or an intersection 160 or a traffic jam of a passage incapable state is recognized on a more forward side of the travel direction 106 than the intersecting position 130 or the entry position 134.

The host vehicle 10 cannot proceed forward in the event there is a railroad crossing 140 of a passage incapable state, or an intersection 160 of a passage incapable state, or in the case that a traffic jam is occurring on a forward side of the travel direction 106. In accordance with the above configuration, the forward movement limit of the host vehicle 10 for imparting an opportunity of passage to the entering vehicle 100a is carried out in the case that there is the railroad crossing 140 of a passage incapable state, or in the case that there is an intersection 160 of a passage incapable state or a traffic jam is occurring on a forward direction side in the travel direction 106, and therefore, no disadvantage occurs in which forward movement of the host vehicle 10 is delayed due to the forward movement limit. In other words, there is no influence on the forward movement of the host vehicle 10. Further, by carrying out the forward movement limit, unnecessary acceleration of the host vehicle 10 is suppressed, and therefore, energy consumption is reduced.

The vehicle control device 12 is equipped with the time determination unit 84 which determines the first time period t1 from a current point in time until the railroad crossing 140 or the intersection 160 transitions to the passage incapable state, and the second time period t2 required for the host vehicle 10 to pass through the railroad crossing 140 or the intersection 160. The forward movement limit determination unit 82 determines to execute the forward movement limit, in the case it is recognized by the external environment recognition unit 60 that the intersecting road 124 or the entering vehicle 100a is on the forward side of the travel direction 106, further, the railroad crossing 140 or the intersection 160 of a passage capable state is recognized on a more forward side in the travel direction 106 than the intersecting position 130 or the entry position 134, and further, in the case that the first time period t1 is shorter than the second time period t2.

In the case that the first time period t1 is less than the second time period t2, the host vehicle 10 is incapable of passing through the railroad crossing 140 or the intersection 160 before the railroad crossing 140 or the intersection 160 transitions from the passage capable state to the passage incapable state. For this reason, the host vehicle 10 does not proceed forward, and is stopped before crossing the railroad crossing 140 or before the intersection 160. In accordance with the above configuration, since the forward movement limit of the host vehicle 10 for imparting an opportunity of passage to the entering vehicle 100a is performed in the case that the first time period t1 is less than the second time period t2, no disadvantage occurs in which forward movement of the host vehicle 10 is delayed due to the forward movement limit. In other words, there is no influence on the forward movement of the host vehicle 10. Further, by carrying out the forward movement limit, unnecessary acceleration of the host vehicle 10 is suppressed, and therefore, energy consumption is reduced.

The forward movement limit determination unit 82 determines that the forward movement limit should be canceled, in the case that the entering vehicle 100a, which has entered into the travel path 120 from the intersecting road 124, is recognized by the external environment recognition unit 60 while the forward movement limit is being carried out by the vehicle control unit 90, and the vehicle control unit 90 cancels the forward movement limit, in the case it is determined by the forward movement limit determination unit 82 to cancel the forward movement limit.

In accordance with the above configuration, by canceling the forward movement limit of the host vehicle 10 at the point in time when entry of the entering vehicle 100a is completed, it is possible to smooth the flow of traffic on the side of the travel path 120 and on the side of the intersecting road 124, respectively.

The vehicle control device according to the present invention is not limited to the above-described embodiment, and it goes without saying that various additional or alternative configurations could be adopted therein without departing from the essence and gist of the present invention.

The present invention is also applicable to a case in which a vehicle travels on the right side of the road.

What is claimed is:

1. A vehicle control device, comprising:
    an external environment recognition unit adapted to recognize a state of the external environment in the vicinity of a host vehicle;
    a forward movement limit determination unit adapted to determine whether or not to limit forward movement of the host vehicle, on the basis of a recognition result of the external environment recognition unit; and
    a vehicle control unit adapted to perform the forward movement limit on the basis of a determination result of the forward movement limit determination unit;
    wherein the external environment recognition unit recognizes an intersecting road intersecting with a travel path of the host vehicle in front of the host vehicle or an entering vehicle attempting to enter in front of the host vehicle, and recognizes an event is occurring that limits traveling of the host vehicle at a point beyond, in the travel direction of the host vehicle, an intersecting position between the travel path and the intersecting road or an entry position of the entering vehicle,
    the forward movement limit determination unit determines to execute the forward movement limit, in the case the external environment recognition unit recognizes the entering vehicle and the event, and determines not to execute the forward movement limit, in the case the external environment recognition unit recognizes the entering vehicle but does not recognize the event; and
    in the case it is determined by the forward movement limit determination unit that the forward movement limit is to be executed, the vehicle control unit utilizes the intersecting position or the entry position as a reference point, and performs the forward movement limit up to the reference point, and
    the forward movement limit determination unit maintains the forward movement limit until the entering vehicle has finished entering into the travel path, and cancels the forward movement limit when the entering vehicle has finished entering into the travel path.

2. The vehicle control device according to claim 1, wherein, as the forward movement limit, the vehicle control unit performs a travel control to automatically decelerate or stop the host vehicle, or a notification control to prompt a vehicle occupant to decelerate or stop the host vehicle.

3. The vehicle control device according to claim 1, wherein the forward movement limit determination unit determines to execute the forward movement limit, in the case it is recognized by the external environment recognition unit that the intersecting road or the entering vehicle is on the forward side of the travel direction, and further, a railroad crossing of a passage incapable state, or an intersection or a traffic jam of a passage incapable state is recognized on a more forward side of the travel direction than the intersecting position or the entry position.

4. The vehicle control device according to claim 3, further comprising:
    a time determination unit adapted to determine a first time period from a current point in time until the railroad crossing or the intersection transitions to the passage incapable state, and a second time period required for the host vehicle to pass through the railroad crossing or the intersection;
    wherein the forward movement limit determination unit determines to execute the forward movement limit, in the case it is recognized by the external environment recognition unit that the intersecting road or the entering vehicle is on the forward side of the travel direction, further, the railroad crossing or the intersection of a passage capable state is recognized on a more forward side in the travel direction than the intersecting position or the entry position, and further, in the case that the first time period is shorter than the second time period.

5. The vehicle control device according to claim 1, wherein:

the forward movement limit determination unit determines that the forward movement limit should be canceled, in the case that the entering vehicle, which has entered into the travel path from the intersecting road, is recognized by the external environment recognition unit while the forward movement limit is being carried out by the vehicle control unit; and the vehicle control unit cancels the forward movement limit, in the case it is determined by the forward movement limit determination unit to cancel the forward movement limit.

6. A vehicle control device, comprising:

an external environment recognition unit adapted to recognize a state of the external environment in the vicinity of a host vehicle;

a forward movement limit determination unit adapted to determined whether or not to limit forward movement of the host vehicle, on the basis of a recognition result of the external environment recognition unit; and a vehicle control unit adapted to perform the forward movement limit on the basis of a determination result of the forward movement limit determination unit;

wherein the external environment recognition unit recognizes an intersecting road intersecting with a travel path of the host vehicle in front of the host vehicle or an entering vehicle attempting to enter in front of the host vehicle, and recognizes an event is occurring that limits traveling of the host vehicle at a point beyond, in the travel direction of the host vehicle, an intersecting position between the travel path and the intersecting road or an entry position of the entering vehicle, the forward movement limit determination unit determines to execute the forward movement limit, in the case the external environment recognition unit recognizes the entering vehicle and the event, and determines not to execute the forward movement limit, in the case the external environment recognition unit recognizes the entering vehicle but does not recognize the event, and the forward movement limit determination unit maintains the forward movement limit until the entering vehicle has finished entering into the travel path, and cancels the forward movement limit when the entering vehicle has finished entering into the travel path.

7. The vehicle control device according to claim 6, wherein the external environment recognition unit recognizes presence or absence of the entering vehicle on the basis of a direction to which a front part of another vehicle is facing, a distance between the another vehicle and a sidewalk, or a traveling direction of the another vehicle.

* * * * *